(12) United States Patent
Sakurai et al.

(10) Patent No.: US 7,201,967 B2
(45) Date of Patent: Apr. 10, 2007

(54) ELECTROPHOTOGRAPHIC ENDLESS BELT, PROCESS FOR PRODUCING ELECTROPHOTOGRAPHIC ENDLESS BELT, AND ELECTROPHOTOGRAPHIC APPARATUS

(75) Inventors: Yuji Sakurai, Susono (JP); Akihiko Nakazawa, Shizuoka-ken (JP); Atsushi Tanaka, Susono (JP); Hidekazu Matsuda, Numazu (JP); Takashi Kusaba, Shizuoka-ken (JP)

(73) Assignee: Canon Kabushiki Kaisha, Ohta-ku, Tokyo (JP)

( * ) Notice: Subject to any disclaimer, the term of this patent is extended or adjusted under 35 U.S.C. 154(b) by 367 days.

(21) Appl. No.: 10/995,269

(22) Filed: Nov. 24, 2004

(65) Prior Publication Data
US 2005/0142368 A1    Jun. 30, 2005

(30) Foreign Application Priority Data
Nov. 28, 2003    (JP)    ............................. 2003-400055

(51) Int. Cl.
*G03G 15/00*    (2006.01)
*G03G 13/00*    (2006.01)
*B32B 1/08*    (2006.01)

(52) U.S. Cl. .................. 428/475.5; 428/35.7; 399/297; 399/302; 399/308; 430/31; 430/32; 430/126; 525/182; 525/183

(58) Field of Classification Search ................ 525/182, 525/183; 428/475.5, 35.7; 399/297, 302, 399/308; 430/31, 32, 126
See application file for complete search history.

(56) References Cited

U.S. PATENT DOCUMENTS

| 5,021,036 A | 6/1991 | Tanaka et al. | ............... 474/237 |
| 5,158,619 A | 10/1992 | Kawada et al. | ............. 136/263 |
| 2002/0058189 A1 | 5/2002 | Tanaka et al. | ................ 430/31 |

FOREIGN PATENT DOCUMENTS

| JP | 03-089357 | 4/1991 |
| JP | 05-345368 | 12/1993 |
| JP | 2845059 | 1/1999 |
| JP | 11-352796 | 12/1999 |
| JP | 2001-350347 | 12/2001 |

*Primary Examiner*—Ana Woodward
(74) *Attorney, Agent, or Firm*—Fitzpatrick, Cella, Harper & Scinto (57) ABSTRACT

In an electrophotographic endless belt having a resin layer formed of a resin composition containing a polyamide, the resin composition further contains a copolymer obtained by copolymerization of an olefin and an oxygen-containing heterocyclic compound, a curve (T-$\log_{10} \eta$ curve) showing the relationship between temperature T (° C.) and common logarithm $\log_{10} \eta$ of melt viscosity $\eta$ (Pa·s), of the resin composition has, in the range of $\log_{10} \eta$ of from $\log_{10}$ 1,000 to $\log_{10}$ 8,000, a gently inclined region the inclination Δ $\log_{10} \eta/\Delta T$ of which is from −0.02 to 0, and the gently inclined region has a temperature range of 10° C. or more, and the resin layer has a thickness the maximum thickness of which is 115% or less of the average value of the thickness of the resin layer and the minimum thickness of which is 85% or more of the average value of the thickness of the resin layer. Also disclosed is a process for producing the above electrophotographic endless belt.

19 Claims, 4 Drawing Sheets

ELECTROPHOTOGRAPHIC ENDLESS BELT, PROCESS FOR PRODUCING ELECTROPHOTOGRAPHIC ENDLESS BELT, AND ELECTROPHOTOGRAPHIC APPARATUS

BACKGROUND OF THE INVENTION

1. Field of the Invention

This invention relates to an electrophotographic endless belt such as an intermediate transfer belt or a transfer material transporting belt, and also relates to a process for producing the electrophotographic endless belt, and an electrophotographic apparatus having the electrophotographic endless belt.

2. Related Background Art

Besides rigid-body drum-shaped members, flexible endless-belt-shaped members (electrophotographic endless belts or electrophotographic seamless belts) are conventionally used in transfer material transporting members, intermediate transfer members and so forth used in electrophotographic apparatus such as copying machines and laser beam printers.

In recent years, color (such as full-color) electrophotographic apparatus have been put forward into practical use, and there is an increasing demand for electrophotographic endless belts as well, such as transfer material transporting belts and intermediate transfer belts.

In recent years, as an electrophotographic endless belt, an endless belt having a layer (resin layer) formed of a resin composition containing a resin is in wide use.

As the resin used in this resin composition, for example, polycarbonate is disclosed in Japanese Patent Applications Laid-open No. H03-089357 and No. H05-345368, an ethylene-tetrafluoroethylene copolymer (ETFE) is disclosed in Japanese Patent Application Laid-open No. H08-025232, and a polymer blend of polyalkylene terephthalate and polycarbonate is disclosed in Japanese Patent No. 2,845,059.

However, the use of these resins in the electrophotographic endless belts involves the following problems.

For example, the polycarbonate has a disadvantage that it has not so high resistance to cracking and hence, where an endless belt making use of this resin is repeatedly used, it tends to cause cracking, resulting in a short lifetime.

The ethylene-tetrafluoroethylene copolymer also has a disadvantage that it tends to cause creeping and hence, where an endless belt making use of this resin is repeatedly used, the endless belt may come to stretch, resulting in a short lifetime. As a method for making the level of creeping smaller, a method is available in which the endless belt is made in a large thickness. However, making the endless belt in a large thickness results in a low resistance to cracking. A method is also available in which a mechanism for changing the tension to be applied to the endless belt in accordance with the length of the endless belt is added to an endless-belt stretch-over mechanism provided in the main body of an electrophotographic apparatus, to keep the endless belt from undergoing difficulties due to creeping. In this case, however, component parts are required in a larger number, and this necessitates the main body of the electrophotographic apparatus to be larger and causes a rise in cost.

The polymer blend of polyalkylene terephthalate and polycarbonate promises some higher resistance to cracking than the polycarbonate. However, under actual circumstances, it can not completely sufficiently meet the demand for higher image quality and higher running (extensive-operation) performance in recent years.

As a method for solving these problems, a method is available in which a polyamide, having a high toughness among engineering plastics, is used in the electrophotographic endless belt (see, e.g., Japanese Patent Applications Laid-open No. H11-352796 and No. 2001-350347.

However, the polyamide has a large rate of change in melt viscosity with respect to temperature, and hence extrusion stability may lower also by the deflection of extrusion conditions, resulting in a large thickness non-uniformity. If such an electrophotographic endless belt having a large thickness non-uniformity is used as an endless belt-shaped transfer member such as the transfer material transporting belt or the intermediate transfer belt, the belt may have a poor transfer performance. Stated specifically, transfer non-uniformity or blank areas caused by poor transfer may occur on reproduced images.

SUMMARY OF THE INVENTION

An object of the present invention it to provide an electrophotographic endless belt having superior thickness uniformity and transfer performance and also having superior belt durability, a process for producing the electrophotographic endless belt, and an electrophotographic apparatus having the electrophotographic endless belt.

More specifically, the present invention is an electrophotographic endless belt comprising a resin layer formed of a resin composition containing a polyamide, wherein;

the resin composition further contains a copolymer obtained by copolymerization of an olefin and an oxygen-containing heterocyclic compound;

a curve (T-$\log_{10}$ η curve) showing the relationship between temperature T (° C.) and common logarithm $\log_{10}$ η of melt viscosity η (Pa·s), of the resin composition has, in the range of $\log_{10}$ η of from $\log_{10}$ 1,000 to $\log_{10}$ 8,000, a gently inclined region the inclination $\Delta \log_{10} \eta/\Delta T$ of which is from −0.02 to 0, and the gently inclined region has a temperature range of 10° C. or more; and the resin layer has a thickness the maximum thickness of which is 115% or less of the average value of the thickness of the resin layer and the minimum thickness of which is 85% or more of the average value of the thickness of the resin layer.

The present invention is also a process for producing an electrophotographic endless belt having a resin layer formed of a resin composition containing a polyamide; the process comprising the steps of:

extruding the resin composition from the interior of an extruder connected to a circular die, to the exterior of the extruder via the circular die to obtain a cylindrical product of the resin composition; and forming the cylindrical product of the resin composition into the resin layer of the electrophotographic endless belt;

wherein;

the resin composition further contains a copolymer obtained by copolymerization of an olefin and an oxygen-containing heterocyclic compound;

a curve (T-$\log_{10}$ η curve) showing the relationship between temperature T (° C.) and common logarithm $\log_{10}$ η of melt viscosity η (Pa·s) of the resin composition has, in the range of $\log_{10}$ η of from $\log_{10}$ 1,000 to $\log_{10}$ 8,000, a gently inclined region the inclination $\Delta \log_{10} \eta/\Delta T$ of which is from −0.02 to 0, and the gently inclined region has a temperature range of 10° C. or more; and when the resin composition is extruded, the resin composition has temperature which is within the temperature range of the gently inclined region.

The present invention is still also an electrophotographic apparatus having the above electrophotographic endless belt or the electrophotographic endless belt produced by the above production process.

DESCRIPTION OF THE PREFERRED EMBODIMENTS

The electrophotographic endless belt of the present invention has a resin layer formed of a resin composition containing a resin, or a polyamide.

In the present invention, the "resin layer" is a layer formed of a resin composition containing a resin (optionally containing various kinds of additives). The endless belt having the resin layer includes one consisting of a single resin layer (a single-layer type endless belt), and one formed by laminating a plurality of resin layers or one formed by laminating to the resin layer a layer other than the resin layer (a lamination type endless belt). The present invention is applicable whatever layer configuration the endless belt has, as long as it is the endless belt having a resin layer. In the case when the electrophotographic endless belt is the lamination type one, the resin layer to which the present invention is applied may be any of a surface layer, an intermediate layer and a base layer.

The present invention is described below in detail.

The resin composition containing a polyamide is further incorporated with a copolymer obtained by copolymerization of an olefin and an oxygen-containing heterocyclic compound (this copolymer is hereinafter also "specific modified olefin"), whereby the resin composition containing a polyamide can be made to have a small rate of change in melt viscosity with respect to temperature. This enables improvement in extrusion stability, and enables extrusion to be kept from varying in carrying out extrusion by means of an extruder, so that a resin layer having small thickness non-uniformity can be obtained.

Incidentally, the above specific modified olefin is not limited to those in the form of copolymers, and may also be terpolymers, or more multiple polymers, which further make use of compounds other than the olefin and oxygen-containing heterocyclic compound. The compounds other than the olefin and oxygen-containing heterocyclic compound may include vinyl acetate and methyl acrylate.

The resin composition used in the present invention, containing the polyamide and the above specific modified olefin, must satisfy as described previously the condition that:

the T-$\log_{10} \eta$ curve [T: temperature (° C.); $\eta$: melt viscosity (Pa·s)] has, in the range of $\log_{10} \eta$ of from $\log_{10}$ 1,000 to $\log_{10}$ 8,000, a gently inclined region the inclination $\Delta \log_{10} \eta/\Delta T$ of which is from −0.02 to 0; and the gently inclined region has a temperature range of 10° C. or more. This means that the region in which the rate of change in melt viscosity with respect to temperature, of the resin composition is present in a range broad enough to be well adaptable to the deflection of extrusion conditions. The resin composition is extruded in such a way that the temperature of the resin composition is kept within the temperature range of this gently inclined region, whereby a resin layer having a small thickness non-uniformity can be obtained even when there occurs the deflection of extrusion conditions.

Incidentally, if the gently inclined region is in a region of more than $\log_{10}$ 8,000 and also the resin composition is extruded at its temperature set to the temperature in the gently inclined region, a high pressure is required for the extrusion, and this may make the extrusion unstable to tend to cause thickness non-uniformity. On the other hand, if the gently inclined region is in a region of less than $\log_{10}$ 1,000 and also the resin composition is extruded at its temperature set to the temperature in the gently inclined region, the resin composition may have so low a melt viscosity as to cause rippling at the time of extrusion, also tending to cause thickness non-uniformity.

Figure 5:
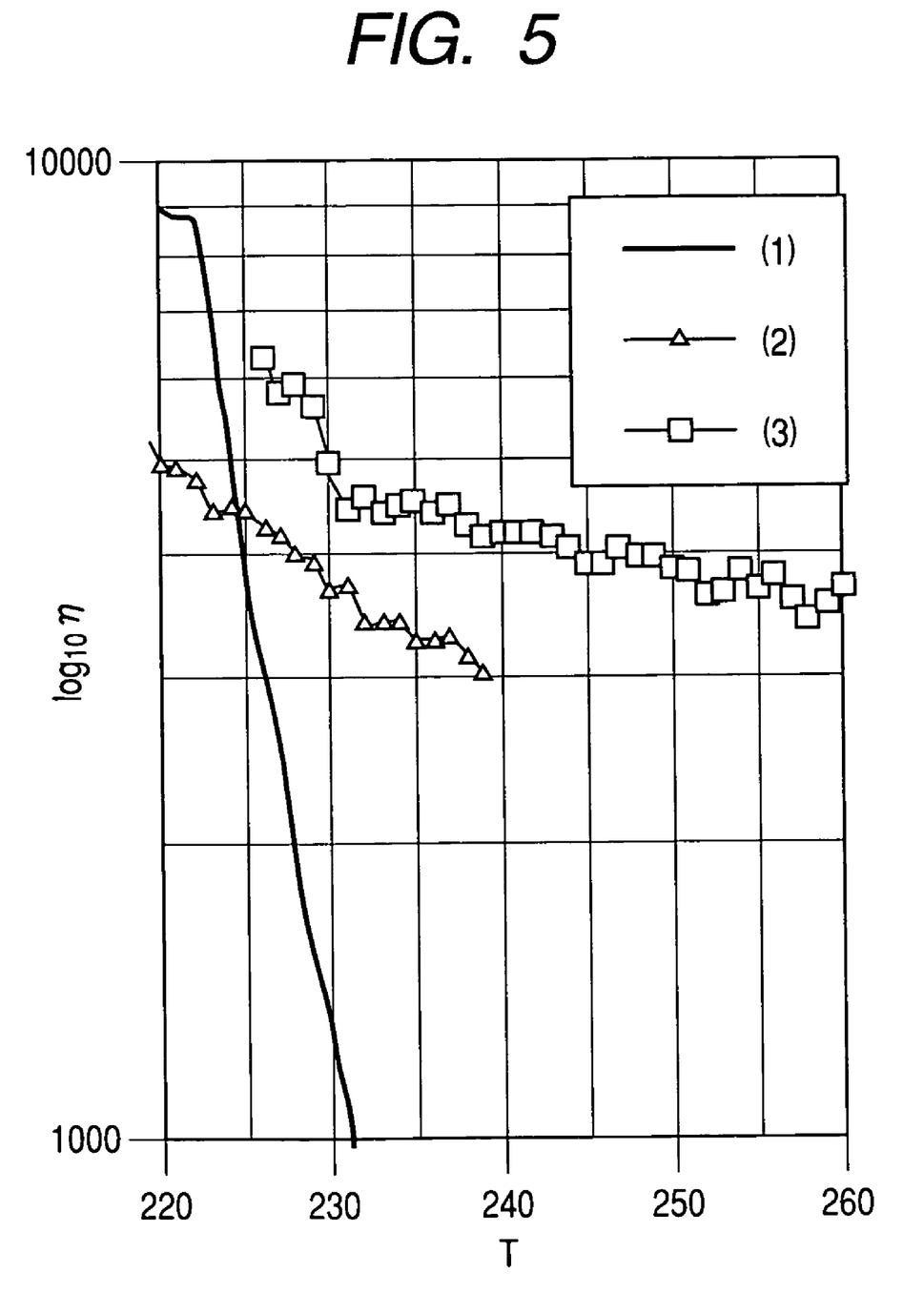
FIG. 5 is a graph showing an example of the T-$\log_{10} \eta$ curve.

An example of the T-$\log_{10} \eta$ curve is shown in FIG. 5.

As in the case of a curve (1) in FIG. 5, where the inclination $\Delta \log_{10} \eta/\Delta T$ of the T-$\log_{10} \eta$ curve is outside the range of from −0.02 to 0, i.e., the resin composition has a large rate of change in melt viscosity with respect to temperature, it comes not well adaptable to the deflection of extrusion conditions. A curve (2) or (3) is a curve having a gently inclined region in which the inclination $\Delta \log_{10} \eta/\Delta T$ of the T-$\log_{10} \eta$ curve is from −0.02 to 0.

In the present invention, the melt viscosity of the resin composition is measured in the following way, using a flow tester CFT-500D Model, manufactured by Shimadzu Corporation.

-Preparation of Sample-

The resin composition is made into powder so that the hole of a cylinder of the flow tester can be filled with it. This is dried for 4 hours in an environment of temperature of 75 to 85° C. and humidity of 0 to 50% RH.

-Measuring Method-

At a constant temperature, 5 kg of a load (test pressure P: 0.49 MPa) is applied to the sample via a piston from a plunger to extrude the sample from a die having an orifice diameter D of 1 mm and a length L of 1 mm, where the level of movement of the piston of the flow tester is measured in accordance with the quantity of extrusion. This level of movement, i.e., the rate of outflow is measured at each temperature. From the resultant values, the melt viscosity $\eta$ (Pa·s) is found according to the following expression (1):

$$\eta = \tau/\gamma \qquad (1)$$
$$= [(\pi \times D^4 \times P)/(128 \times L \times Q)] \times 10^{-3} (\text{Pa} \cdot s).$$

In the above expression (1), $\gamma$ is the shear rate (s$^{-1}$), which is in the relationship of:

$$\gamma = (32Q/\pi D^3) \times 10^3$$

between the rate of outflow Q (cm³/s) and the orifice diameter D (mm). Also, τ is the shear stress (Pa), which is in the relationship of:

$$\tau = PD/4L$$

between the test pressure (MPa), the die orifice diameter D (mm) and the die length L (mm). Also, the rate of outflow Q (cm³/s) is in the relationship of:

$$Q = (X/10) \times (A/t)$$

between the measuring time t (s), the level of movement X (mm) of the piston with respect to the measuring time t (s), and the sectional area A (cm²) of the piston.

-Measuring Conditions-
Heating rate: 5° C./min.
Measurement interval: 2° C.$^{-1}$.
Pre-heating time: 120 s.
Plunger area: 1 cm².

The measurement making use of the above flow tester is made in the ranges of a temperature of 20 to 30° C. and a humidity of 30 to 70% RH, and the common logarithms of melt viscosity are plotted at intervals of a temperature of 1° C. obtain the T-log$_{10}$ η curve.

In the present invention, the inclination Δ log$_{10}$ η/ΔT at an arbitrary temperature To (° C.) of the T-log$_{10}$ η curve is defined by the following expression (2):

$$\Delta \log_{10} \eta / \Delta T = (\log_{10} \eta_{To+5} - \log_{10} \eta_{To-5}) / [(T_{o+5}) - (T_{o-5})] \quad (2)$$
$$= [\log_{10}(\eta_{To+5}/\eta_{To-5})]/10$$

In the above expression (2);
η$_{To+5}$ is the melt viscosity (Pa·s) at To+5 (° C.); and
η$_{To-5}$ is the melt viscosity (Pa·s) at To-5 (° C.)

The inclination Δ log$_{10}$ η/ΔT of the T-log$_{10}$ η curve of the resin composition containing the polyamide and the above specific modified olefin and the temperature range of the gently inclined region of that curve may differ depending on the type of the polyamide and the compounding ratio of the polyamide to the above specific modified olefin. They may also differ depending on the type of the above specific modified olefin, stated specifically, the types of the olefin and oxygen-containing heterocyclic compound which are raw materials of the above specific modified olefin, and also on the copolymerization ratio of the olefin to the oxygen-containing heterocyclic compound. They may still also differ depending on the type(s) of the component(s) other than the polyamide and specific modified olefin which is/are to be contained in the resin composition, the compounding ratio of these and the state of linkage of these.

Accordingly, the above every type and every ratio must appropriately be controlled in order that the resin composition used in the present invention, containing the polyamide and the above specific modified olefin, satisfies the condition that:

the T-log$_{10}$ η curve has, in the range of log$_{10}$ η of from log$_{10}$ 1,000 to log$_{10}$ 8,000, a gently inclined region the inclination Δ log$_{10}$ η/ΔT of which is from −0.02 to 0; and
the gently inclined region has a temperature range of 10° C. or more.

For example, the larger the amount of the above specific modified olefin is made with respect to the amount of the polyamide, and also, in the above specific modified olefin, the larger the amount of the oxygen-containing heterocyclic compound is made with respect to the amount of a unit derived from the olefin, the smaller the absolute value of the inclination Δ log$_{10}$ η/ΔT of the T-log$_{10}$ η curve the resin composition has tends to be. However, if the amount of the polyamide in the resin composition is too small, the effect to be brought by the use of the polyamide may come small.

From the foregoing point of view, the polyamide in the resin composition may preferably be in a proportion of from 40 to 74% by weight based on the whole weight of the resin composition, and the above specific modified olefin in the resin composition may preferably be in a proportion of from 1 to 40% by weight based on the total weight of the polyamide and above specific modified olefin in the resin composition.

The polyamide may also be at least one resin selected from the group consisting of polyamide 6.10 (nylon 6.10), polyamide 6.12 (nylon 6.12), polyamide 11 (nylon 11) and polyamide 12 (nylon 12).

As the olefin which is a raw material of the above specific modified olefin, ethylene is preferred. As the oxygen-containing heterocyclic compound, glycidyl methacrylate or maleic anhydride is preferred.

In the above specific modified olefin, the unit derived from the olefin and the unit derived from the oxygen-containing heterocyclic compound may preferably be in a ratio ranging from 99:1 to 83:12. Also, the molecule of the above specific modified olefin may preferably be a molecule formed by straight-chain linkage between the unit derived from the olefin and the unit derived from the oxygen-containing heterocyclic compound.

The above specific modified olefin, i.e., the copolymer obtained by copolymerization of the olefin and the oxygen-containing heterocyclic compound is available as a product.

For example, as products of a copolymer obtained by copolymerization of ethylene and glycidyl methacrylate (an ethylene-glycidyl methacrylate copolymer), it may include BOND FIRST (EV: IGETABOND) E (unit derived from ethylene/unit derived from glycidyl methacrylate=88/12), available from Sumitomo Chemical Co., Ltd.; IGETABOND 2C (unit derived from ethylene/unit derived from glycidyl methacrylate=94/6), available from Sumitomo Chemical Co., Ltd.; IGETABOND 2B (unit derived from ethylene/unit derived from glycidyl methacrylate/unit derived from vinyl acetate=83/12/5), available from Sumitomo Chemical Co., Ltd.; IGETABOND 7B (unit derived from ethylene/unit derived from glycidyl methacrylate/unit derived from vinyl acetate=83/12/5), available from Sumitomo Chemical Co., Ltd.; IGETABOND 7L (unit derived from ethylene/unit derived from glycidyl methacrylate/unit derived from methyl acrylate=67/3/30), available from Sumitomo Chemical Co., Ltd.; and IGETABOND 7M (unit derived from ethylene/unit derived from glycidyl methacrylate/unit derived from methyl acrylate=64/6/30), available from Sumitomo Chemical Co., Ltd. These products are each has the molecule formed by straight-chain linkage between the unit derived from the olefin (ethylene) and the unit derived from the oxygen-containing heterocyclic compound (glycidyl methacrylate).

As products of a copolymer obtained by copolymerization of ethylene and maleic anhydride (an ethylene-maleic anhydride copolymer), it may include, e.g., F3000 (unit derived from ethylene/unit derived from maleic anhydride=99/1), available from Ube Industries, Ltd. Besides, it may also include NUK-ACE GA-002 and NUK-ACE GA-004, available from Nippon Unicar Co., Ltd.

As a method for mixing the polyamide and the above specific modified olefin, a method is preferred in which these are kneaded by means of a kneading machine such as a single-screw extruder or a twin-screw extruder.

A process for producing the electrophotographic endless belt of the present invention is described next in detail.

The process for producing the electrophotographic endless belt of the present invention is as mentioned previously a production process having the steps of:

extruding the resin composition from the interior of an extruder connected to a circular die, to the exterior of the extruder via the circular die to obtain a cylindrical product of the resin composition; and forming the cylindrical product of the resin composition into the resin layer of the electrophotographic endless belt.

In the step of forming the cylindrical product of the resin composition into the resin layer of the electrophotographic endless belt, it may preferably be formed under such conditions that the thickness of the resin layer of the electrophotographic endless belt is smaller than the die gap of the circular die.

For example, where a resin layer having a thickness of 150 µm is formed with a circular die having a die gap of 150 µm, a deflection of the die gap by 10 µm makes the thickness of the resin layer change exactly by 10 µm. Hence, for example, in order to control the thickness non-uniformity of the resin layer to 1 µm or less, the deflection of the die gap must be controlled to 1 µm or less. It, however, is difficult to adjust the die gap at intervals of 1 µm, and hence it is difficult to make the resin layer have a small thickness non-uniformity.

However, where the resin layer having a thickness of 150 µm is formed with a circular die having a die gap of 1,500 µm, even a deflection of the die gap by 10 µm makes the thickness of the resin layer change by 1/10 of 10 µm, i.e., 1 µm, so that the resin layer can be made to have a small thickness non-uniformity.

As a method for making the resin layer have a smaller thickness than the die gap of the circular die, available are, e.g., a method in which a cylindrical product of the resin composition is scale-up inflated in such a way that the cylinder diameter of the resin layer is larger than the bore diameter of the circular die, and a method in which the take-off speed of a cylindrical product of the resin composition extruded from the circular die is set higher than the extrusion speed of the same.

In the case when the former method is employed, the rate of scale-up (i.e., resin layer cylinder diameter/circular die bore diameter ratio) may preferably be 4.0 or less. If the rate of scale-up is too large, the resin layer may have a large thickness non-uniformity.

The latter method is useful when the resin composition has a relatively low melt viscosity. This is because, where the resin composition has a low melt viscosity, a hole or holes may be made when such a resin composition is scale-up inflated. In the case when the latter method is employed, the rate of scale-up may be set not more than 1, but may preferably be 0.5 or more. If the rate of scale-up is too small, the taken-off speed must be made vastly higher, and this may make the resin layer have a large thickness non-uniformity.

As an example the former method, i.e., the method in which a cylindrical product of the resin composition is scale-up inflated in such a way that the cylinder diameter of the resin layer is larger than the bore diameter of the circular die, it may include a blown-film extrusion (inflation) method.

Figure 1:
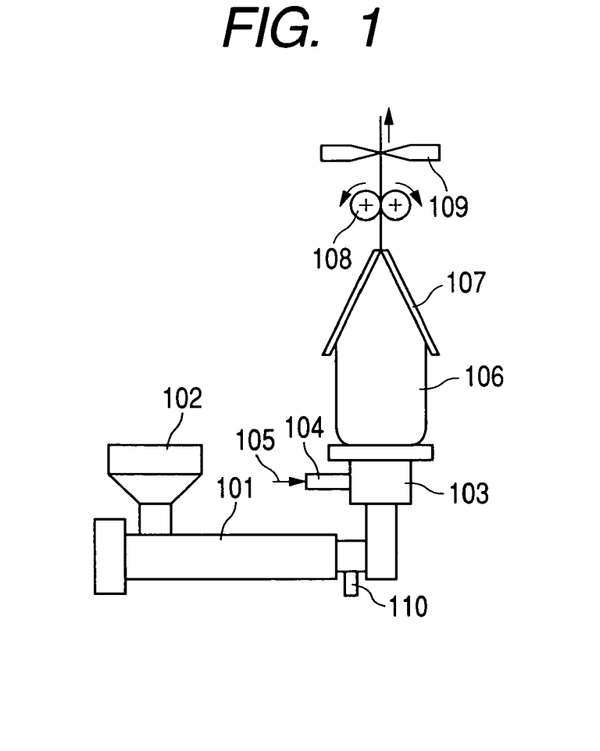
FIG. 1 is a schematic view showing an example of the construction of an apparatus for producing the electrophotographic endless belt, which employs a blown-film extrusion (inflation) method.

FIG. 1 is a schematic view showing an example of the construction of an apparatus for forming the resin layer of the electrophotographic endless belt by the blown-film extrusion method.

First, a resin composition prepared by premixing the polyamide and the above specific modified olefin under the stated formulation is put into an extruder 101 from a hopper 102. Temperature and screw construction in the extruder 101 are so selected that the resin composition may have a melt viscosity for enabling extrusion into a belt and also the polyamide and the above specific modified olefin are mutually uniformly dispersed.

The resin composition is melt-kneaded in the extruder 101 into a melt, which is then put out of the extruder 101 through a circular die 103 to come into a cylindrical product of the resin composition.

In the case of the blown-film extrusion method, the circular die 103 is provided with, e.g., a gas inlet passage 104. Through the gas inlet passage 104, gas 105 (such as air, nitrogen, carbon dioxide or argon) kept at atmospheric pressure or more is blown into the circular die 103 from the gas inlet passage 104, whereupon the cylindrical product inflates while scaling up in the diametrical direction and comes into a cylindrical film 106 of the resin composition. Incidentally, the extrusion may be carried out without blowing the gas 105 into the gas inlet passage 104.

The temperature of the resin composition at the time the resin composition is extruded may be measured with a thermometer 110, or with a thermometer (not shown) disposed in the vicinity of the outlet of the circular die 103.

The cylindrical film 106 of the resin composition is drawn upward by pinch rollers 108 while being cooled by a cooling ring (not shown). When the cylindrical film 106 is drawn upward, it passes through the space defined by a dimension stabilizing guide 107 having the stated dimensions, whereby the length in peripheral direction (peripheral length) of the resin layer of the electrophotographic endless belt is fixed, and also it is cut with a cutter 109 in the desired length, whereby the length in generatrix direction (width) of the resin layer of the electrophotographic endless belt is fixed.

Thus, the resin layer of the electrophotographic endless belt can be formed. In the case of an electrophotographic endless belt of a single-layer type, this resin layer is the electrophotographic endless belt.

Figure 2:
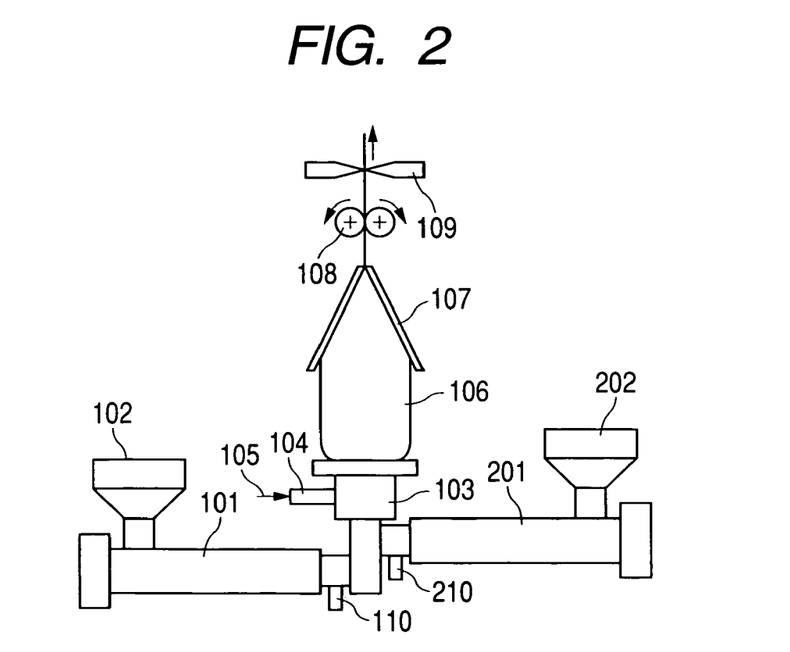
FIG. 2 is a schematic view showing another example of the construction of an apparatus for producing the electrophotographic endless belt, which employs a blown-film extrusion (inflation) method.

In the case of an electrophotographic endless belt having two resin layers and where both the resin layers are formed by the blown-film extrusion method, a second extruder 201 is additionally provided as shown in FIG. 2 (202 denotes a second hopper). A cylindrical product of the resin composition from the extruder 101 and a cylindrical product of the resin composition from the extruder 201 are simultaneously sent into a double-layer circular die 103, and the two layers are scale-up inflated simultaneously, thus an electrophotographic endless belt of double-layer construction can be obtained. In the case of triple or more layer construction as well, the extruder may be provided in the number corresponding to the number of layers. Reference numeral 210 denotes a thermometer for measuring the temperature of the resin composition.

When the cylindrical film of the resin composition is cut with a cutter in the stated length, the cylindrical film of the resin composition may preferably continuously be cut in the direction perpendicular to its generatrix direction. When cut continuously, cutting in the state the cutter is stopped may produce a time difference between the beginning of cut and the finish of cut, so that the cylindrical film is obliquely cut.

Hence, it is preferable to use a cutter which moves at the same speed as the take-off speed.

As a method of removing folds of the endless belt or making the endless belt surface smooth, a method is available which, e.g., makes use of a set of cylindrical forms made of materials having different coefficients of thermal expansion and having different diameters.

Stated specifically, a small-diameter cylindrical form (inner form) has a coefficient of thermal expansion made larger than the coefficient of thermal expansion of a large-diameter cylindrical form (outer form). The cylindrical film (endless belt) obtained by extrusion is placed over this inner form. Thereafter, the inner form with film is inserted into the outer form so that the cylindrical film is held between the inner form and the outer form. A gap between the inner form and the outer form may be determined by calculation on the bases of heating temperature, difference in coefficient of thermal expansion between the inner form and the outer form and pressure required.

A form in which the inner form, the endless belt and the outer form have been set in the order from the inside is heated to the vicinity of the softening point temperature of the polyamide resin used in the endless belt. As a result of the heating, the inner form, having a larger coefficient of thermal expansion, acts so as to expand more than the inner diameter of the outer form, and hence a uniform pressure is applied to the whole endless belt. Here, the surface of the endless belt having reached the vicinity of its softening point is pressed against the inner surface of the outer form, so that the folds can be removed. Thereafter, these are cooled, and then the endless belt is removed from the forms, thus an endless belt from which the folds have been removed can be obtained. This method enables dimensional control and modification of surface properties simultaneously. Also, the endless belt to be placed over the inner form may be superposed in plurality whereby a multi-layer endless belt is obtainable.

The electrophotographic endless belt of the present invention can be produced by the production process described above.

The electrophotographic endless belt may preferably have a volume resistivity of from $10^0$ to $10^{13}$ Ω·cm, and particularly preferably from $10^8$ to $10^{13}$ Ω·cm.

The electrophotographic endless belt may also preferably have a surface resistivity of from $10^0$ to $10^{17}$ Ω/square, and particularly preferably from $10^6$ to $10^{14}$ Ω/square.

To control the volume resistivity and surface resistivity of the electrophotographic endless belt, a conducting agent may be added for example. As the conducting agent, either of an electron-conductive conducting agent and an ion-conductive conducting agent may be used.

As the electron-conductive conducting agent, it may include, e.g., conductive carbons such as KETJEN BLACK and acetylene black, rubber-purpose carbons such as SAF, ISAF, HAF, FEF, GPF, SRF, FT and MT, color-ink-purpose carbon subjected to oxidation treatment, thermally decomposed carbon, powders of graphite such as natural graphite and artificial graphite, powders of metals such as copper, nickel, iron and aluminum, powders of metal oxides such as titanium oxide, zinc oxide and tin oxide, and powders of conductive high polymers such as polyaniline, polypyrrole and polyacetylene.

As the ion-conductive conducting agent, it may include i) antistatic agents as exemplified by cationic surface-active agents such as perchlorates, chlorates, tetrafluoroborates, sulfates or ethosulfates of lauryl trimethylammonium, stearyl trimethylammonium, octadecyl trimethylammonium, dodecyl trimethylammonium, hexadecyl trimethylammonium or modified fatty acid dimethylammonium, and quaternary ammonium salts of benzyl halide salts such as benzyl bromide salt and benzyl chloride salt, anionic surface-active agents such as aliphatic sulfonates, higher alcohol sulfuric ester salts, higher alcohol ethylene oxide addition sulfuric ester salts, higher alcohol phosphoric ester salts and higher alcohol ethylene oxide addition phosphoric ester salts, amphoteric surface-active agents such as all kinds of betaines, and nonionic surface-active agents such as higher alcohol ethylene oxides, polyethylene glycol fatty esters and polyhydric alcohol fatty esters; ii) electrolytes as exemplified by salts of metals belonging to Group 1 of the periodic table, such as $Li^+$, $Na^+$ and $K^+$, such as $LiCF_3SO_3$, $NaClO_4$, $LiClO_4$, $LiAsF_6$, $LiBF_4$, NaSCN, KSCN and NaCl, or salts of $NH4^+$; and iii) salts of metals belonging to Group 2 of the periodic table such as $Ca^{2+}$ and $Ba^{2+}$, e.g., $Ca(ClO)_4$ and these salts having at least one group having active hydrogen capable of reacting with isocyanate, such as a hydroxyl group, a carboxyl group or a primary or secondary amine group. It may further include complexes of these with polyhydric alcohols and derivatives thereof, such as 1,4-butanediol, ethylene glycol, polyethylene glycol, propylene glycol and polypropylene glycol, or complexes of the same with monools such as ethylene glycol monomethyl ether and ethylene glycol monoethyl ether.

The conducting agent may be used alone or in combination of two or more.

Any desired additives may also be added as long as the effect of the present invention is not damaged. For example, they may include antihydrolytic agents such as carbodiimide; antioxidants such as phenolic type, phosphoric type, sulfuric type and amine type ones; light stabilizers such as HALS (hindered amine light stabilizer); flame retardants such as halogen type, phosphorus type, antimony type, magnesium hydroxide and silicone resins; lubricants such as fluorine resins and silicone oils; and reinforcing agents such as glass fiber, carbon fiber and aramid fiber. These additives may also be used alone or in combination of two or more.

The electrophotographic endless belt may also preferably have volume resistivity and surface resistivity whose maximum values are within 20 times their minimum values.

In particular, the maximum value of volume resistivity in the peripheral direction of the endless belt may preferably be within 20 times its minimum value. This is because, if the maximum value of volume resistivity in the peripheral direction is greater than 20 times its minimum value, non-uniform transfer may occur in the peripheral direction, or, when voltage is applied at a plurality of spots, electric current may flow from some voltage-applied spots into other voltage-applied spots through areas having a low resistance in the peripheral direction, so that the disorder of voltage control at such other spots may make any normal operation impossible.

The maximum value of surface resistivity in the peripheral direction may also preferably be within 20 times its minimum value. This is because, if the maximum value of surface resistivity in the peripheral direction of the belt is greater than 20 times its minimum value, non-uniform transfer may occur in the peripheral direction, or, when voltage is applied at a plurality of spots, electric current may flow from some voltage-applied spots into other voltage-applied spots through areas having a low resistance in the peripheral direction, so that the disorder of voltage control at such other spots may make any normal operation impossible.

The maximum value of volume resistivity in the generatrix direction may also preferably be within 20 times its minimum value. This is because, if the maximum value of volume resistivity in the generatrix direction of the belt is greater than 20 times its minimum value, non-uniform transfer may occur in the generatrix direction, or excessive electric current may flow into portions having minimum resistance, bringing about a possibility of faulty operation of the apparatus.

The maximum value of surface resistivity in the generatrix direction may also preferably be within 20 times its minimum value. This is because, if the maximum value of surface resistivity in the generatrix direction of the belt is greater than 20 times its minimum value, non-uniform transfer may also occur in the generatrix direction, or, when a cleaning method is used in which stated electric charges are imparted to transfer residual toners to return them onto the photosensitive drum, excessive electric current may flow from the charge-providing charging member into the belt at its portions having minimum surface resistivity, so that any sufficient electric field can not be applied to such areas in their generatrix direction, and hence non-uniform cleaning may occur in the generatrix direction.

Incidentally, the volume resistivity and the surface resistivity do not indicate mere difference in conditions of measurement, but indicate quite different electrical characteristics. That is, when voltage and current to be applied to the electrophotographic endless belt are applied in the thickness direction, the movement of electric charges in the electrophotographic endless belt is chiefly determined by the electrophotographic endless belt's internal structure and physical properties. As the result, the surface potential, charge elimination rate and so forth of the electrophotographic endless belt are determined. On the other hand, when the voltage and current are so applied that electric charges are given and received only on the surface of the electrophotographic endless belt, charging and charge elimination are determined only depending on the proportion of presence of additives or resistance control agents on the surface, almost without depending on the electrophotographic endless belt's internal structure and layer configuration.

Hence, from the viewpoints of transfer performance and cleaning performance, it is preferable for these volume resistivity and surface resistivity to be both brought into the above ranges.

A method of measuring the volume resistivity and surface resistivity of the electrophotographic endless belt in the present invention is described below -Measuring Instrument-
Resistance meter: Ultra-high resistance meter R8340A (manufactured by Advantest Corporation).
Sample box: Sample box TR42 for ultra-high resistance measurement (manufactured by Advantest Corporation).
The main electrode is 25 mm in diameter, and the guard-ring electrode is 41 mm in inner diameter and 49 mm in outer diameter.

-Sample-
The electrophotographic endless belt is cut in a circular form of 56 mm in diameter. After cutting, it is provided, on its one side, with an electrode over the whole surface by forming a Pt—Pd deposited film and, on the other side, provided with a main electrode of 25 mm in diameter and a guard electrode of 38 mm in inner diameter and 50 mm in outer diameter by forming Pt—Pd deposited films. The Pt—Pd deposited films are formed by carrying out vacuum deposition for 2 minutes using Mild Sputter E1030 (manufactured by Hitachi Ltd.). The one on which the vacuum deposition has been carried out is used as the sample.

-Measurement Conditions-
Measurement atmosphere: 23° C./55% RH.
Here, the measuring sample is previously kept left in a environment of 23° C./55% RH for 12 hours or more.
Measurement mode: Discharge for 10 seconds, and charge and measurement for 30 seconds.
Applied voltage: 100 V.

The electrophotographic endless belt may preferably have a thickness of from 45 µm to 300 µm, and more preferably from 50 µm to 270 µm.

The electrophotographic endless belt may also preferably be in a thickness non-uniformity of within ±15%. More specifically, it is preferable that the maximum value of the thickness of the electrophotographic endless belt is 115% or less of its average value and also the minimum value thereof is 85% or more of its average value.

The resin layer of the electrophotographic endless belt may also preferably be in a thickness non-uniformity of within ±15%. More specifically, it is preferable that the maximum value of the resin layer of the thickness of the electrophotographic endless belt is 115% or less of its average value and also the minimum value thereof is 85% or more of its average value.

In the present invention, the thickness of the electrophotographic endless belt is the value found when measured with a dial gauge measurable by 1 µm in minimum value, over the whole periphery of the electrophotographic endless belt at its middle and at 40 spots at equal intervals in the peripheral direction.

Figure 3:
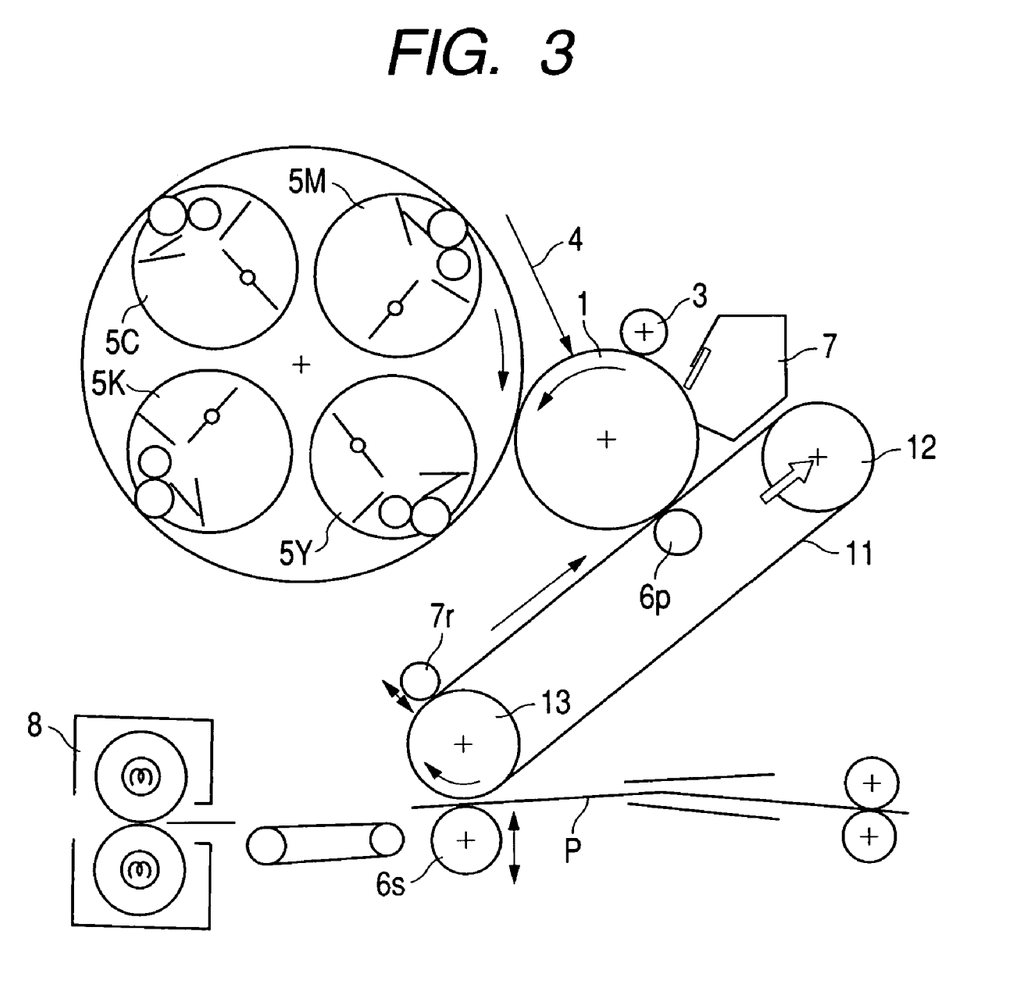
FIG. 3 is a schematic view showing an example of the construction of an intermediate transfer type color electrophotographic apparatus.

FIG. 3 schematically illustrates an example of the construction of a color electrophotographic apparatus of an intermediate transfer system. The transfer of toner images from an electrophotographic photosensitive member to a transfer material is chiefly performed by a primary transfer charging member, an intermediate transfer belt and a secondary transfer charging member.

In FIG. 3, reference numeral 1 denotes a cylindrical electrophotographic photosensitive member, which is rotatingly driven in the direction of an arrow at a prescribed peripheral speed.

The electrophotographic photosensitive member 1 is uniformly electrostatically charged on its surface to a positive or negative, stated potential through a primary charging member 3. The photosensitive member thus charged is then exposed to exposure light (imagewise exposure light) 4 emitted from an exposure means (not shown) for slit exposure or laser beam scanning exposure. The exposure light used here is exposure light corresponding to a first-color-component image (e.g., a yellow-component image) of an intended full-color image. Thus, on the surface of the electrophotographic photosensitive member 1, first-color-component electrostatic latent images (yellow-color-component electrostatic latent images) are successively formed which correspond to the first-color-component image of the intended full-color image.

An intermediate transfer belt 11 stretched over a stretch-over roller 12 and a secondary-transfer opposing roller 13 is rotatingly driven in the direction of an arrow at substantially the same peripheral speed as the electrophotographic photosensitive member 1 (e.g., at a speed of 97 to 103% in respect to the peripheral speed of the electrophotographic photosensitive member 1).

The first-color-component electrostatic latent images formed on the surface of the electrophotographic photosensitive member 1 are developed with a first-color toner (yellow toner) contained in a developer held by a first-color developer carrying member (yellow developer carrying member) 5Y, to form first-color toner images (yellow toner images). Then, the first-color toner images formed and held on the surface of the electrophotographic photosensitive member 1 are successively primarily transferred on to the surface of the intermediate transfer belt 11 passing through between the electrophotographic photosensitive member 1 and a primary-transfer charging member (primary-transfer charging roller) 6p, by the aid of a primary-transfer bias applied from the primary-transfer charging member 6p.

The surface of the electrophotographic photosensitive member 1 from which the first-color toner images have been transferred is cleaned by a cleaning member 7 to remove primary-transfer residual developer (toner) to make the surface clean. Thereafter, the photosensitive member thus cleaned is used for the next-color image formation.

Second-color toner images (magenta toner images), third-color toner images (cyan toner images) and fourth-color toner images (black toner images) are transferred to the surface of the electrophotographic photosensitive member 1 and then sequentially primarily transferred to the surface of the intermediate transfer belt 11, in the same manner as the first-color toner images. Thus, synthesized toner images corresponding to the intended full-color image are formed on the surface of the intermediate transfer belt 11. In the course of the first-color to fourth-color primary transfer, a secondary-transfer charging member (secondary-transfer charging roller) 6s and a charge-providing member (charge-providing roller) 7r stand separate from the surface of the intermediate transfer belt 11.

The synthesized toner images formed on the surface of the intermediate transfer belt 11 are successively secondarily transferred on to a transfer material (such as paper) P by the aid of a secondary-transfer bias applied from the secondary-transfer charging member 6s; the transfer material P being taken out and fed from a transfer material feeding means to the part (contact zone) between the secondary-transfer opposing roller 13/intermediate transfer belt 11 and the secondary-transfer member 6s in the manner synchronized with the rotation of the intermediate transfer belt 11.

The transfer material P to which the synthesized toner images have been transferred is separated from the surface of the intermediate transfer belt 11 and guided into a fixing means 8, where the synthesized toner images are fixed, and is then put out of the apparatus as a color image-formed matter (a print or a copy).

The charge-providing member 7r is brought into contact with the surface of the intermediate transfer belt 11 from which the synthesized toner images have been transferred. The charge-providing member 7r provides the secondary-transfer residual developers (toners) held on the surface of the intermediate transfer belt 11, with electric charges having a polarity reverse to that at the time of primary transfer. The secondary-transfer residual developers (toners) having been provided with electric charges having the polarity reverse to that at the time of primary transfer are electrostatically transferred to the surface of the electrophotographic photosensitive member 1 at the contact zone between the electrophotographic photosensitive member 1 and the intermediate transfer belt 11 and the vicinity thereof. Thus, the surface of the intermediate transfer belt 11 from which the synthesized toner images have been transferred is cleaned by the removal of the secondary-transfer residual developers (toners). The secondary-transfer residual developers (toners) having been transferred to the surface of the electrophotographic photosensitive member 1 are removed by the cleaning member 7 together with the primary-transfer residual developers (toners) held on the surface of the electrophotographic photosensitive member 1. The transfer of the secondary-transfer residual developers (toners) from the intermediate transfer belt 11 to the electrophotographic photosensitive member 1 can be performed simultaneously with the primary transfer, and hence the though-put does not lower.

The surface of the electrophotographic photosensitive member 1 from which the transfer residual developers (toners) have been removed by the cleaning member 7 may also be subjected to charge elimination by pre-exposure light emitted from a pre-exposure means. However, where as shown in FIG. 3 contact charging making use of a roller-shaped primary charging member (a primary charging roller) or the like is employed in the charging of the surface of the electrophotographic photosensitive member, the pre-exposure is not necessarily required.

Figure 4:
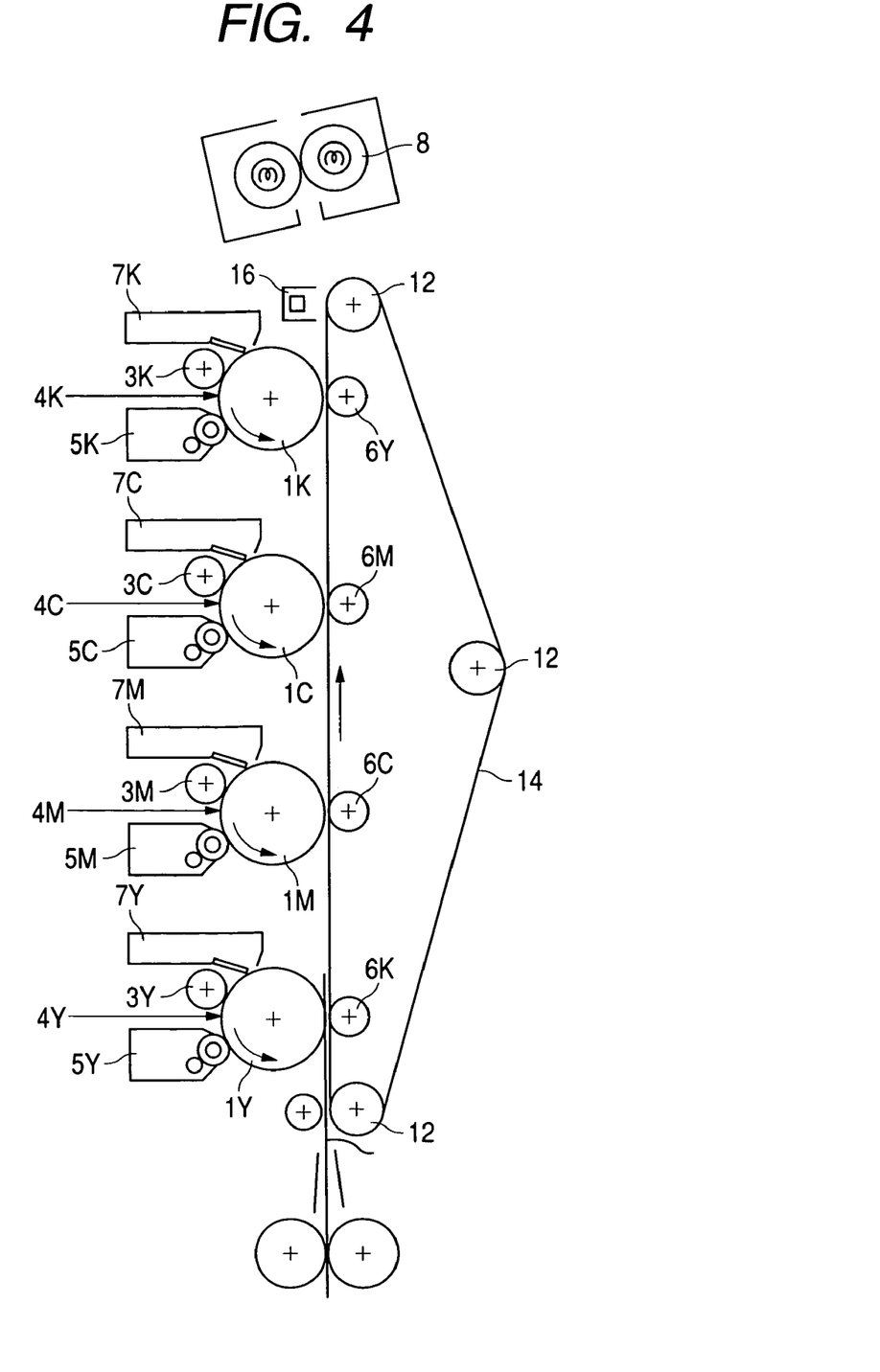
FIG. 4 is a schematic view showing an example of the construction of an in-line type color electrophotographic apparatus.

FIG. 4 schematically illustrates an example of the construction of a color electrophotographic apparatus of an in-line system. The transfer of toner images from an electrophotographic photosensitive member to a transfer material is chiefly performed by a transfer material transport belt and a transfer charging member.

In FIG. 4, reference numerals 1Y, 1M, 1C and 1K denote cylindrical electrophotographic photosensitive members (electrophotographic photosensitive members for first color to fourth color), which are rotatingly driven in the directions of arrows at a stated peripheral speed each.

The surface of the electrophotographic photosensitive member 1Y for first color which is rotatingly driven is uniformly electrostatically charged to a positive or negative, given potential through a primary charging member 3Y for first color. The electrophotographic photosensitive member thus charged is then exposed to exposure light (imagewise exposure light) 4Y emitted from an exposure means (not shown) for slit exposure, laser beam scanning exposure or the like. The exposure light 4Y is exposure light corresponding to a first-color component image (e.g., a yellow component image) of an intended color image. In this way, first-color component electrostatic latent images (yellow component electrostatic latent images) corresponding to the first-color component image of the intended color image are successively formed on the surface of the electrophotographic photosensitive member 1Y.

A transfer material transport belt 14 stretched by stretch-over rollers 12 are rotatingly driven in the direction of an arrow at substantially the same peripheral speed as the electrophotographic photosensitive members 1Y, 1M, 1C and 1K for first color to fourth color (e.g., 97% to 103% in respect to the peripheral speed of each of the electrophotographic photosensitive members 1Y, 1M, 1C and 1K for first color to fourth color). Also, a transfer material (such as paper) P fed from a transfer material feed means is electrostatically held on (attracted to) the transfer material transport belt 14, and is successively transported to the parts (contact zones) between the electrophotographic photosensitive members 1Y, 1M, 1C and 1K for first color to fourth color and the transfer material transport belt.

The first-color component electrostatic latent images thus formed on the surface of the electrophotographic photosensitive member 1Y for first color are developed with a first-color toner contained in a developer held by a developer carrying member 5Y for first color to form first-color toner images (yellow toner images). Then, the first-color toner images thus formed and held on the surface of the electrophotographic photosensitive member 1Y for first color are successively transferred by the aid of a transfer bias applied from a transfer charging member 6Y for first color (transfer charging roller for first color), which are transferred on to a transfer material P held on the transfer material transport belt 14 which passes through between the electrophotographic photosensitive member 1Y for first color and the transfer member 6Y for first color.

The surface of the electrophotographic photosensitive member 1Y for first color from which the first-color toner images have been transferred is brought to removal of the transfer residual developer (toner) through a cleaning member 7Y for first color (cleaning blade for first color). Thus, the surface is cleaned, and thereafter the electrophotographic photosensitive member 1Y for first color is repeatedly used for the formation of the first-color toner images.

The electrophotographic photosensitive member 1Y for first color, the primary charging member 3Y for first color, the exposure means for first color, the developer carrying member 5Y for first color and the transfer charging member 6Y for first color are collectively called an image forming section for first color.

An image forming section for second color which has an electrophotographic photosensitive member 1M for second color, a primary charging member 3M for second color, an exposure means for second color, a developer carrying member 5M for second color and a transfer charging member 6M for second color, an image forming section for third color which has an electrophotographic photosensitive member 1C for third color, a primary charging member 3C for third color, an exposure means for third color, a developer carrying member 5C for third color and a transfer charging member 6C for third color, and an image forming section for fourth color which has an electrophotographic photosensitive member 1K for fourth color, a primary charging member 3K for fourth color, an exposure means for fourth color, a developer carrying member 5K for fourth color and a transfer charging member 6K for fourth color are operated in the same way as the operation of the image forming section for first color. Thus, second-color toner images (magenta toner images), third-color toner images (cyan toner images) and fourth-color toner images (black toner images) are transferred on in order, to the transfer material P which is held on the transfer material transport belt 14 and to which the first-color toner images have been transferred. In this way, synthesized toner images corresponding to the intended color image are formed on the transfer material P held on the transfer material transport belt 14.

The transfer material P on which the synthesized toner images have been formed is separated from the surface of the transfer material transport belt 14, is guided into a fixing means 8, where the toner images are fixed, and is then put out of the apparatus as a color-image-formed material (a print or a copy).

The surfaces of the electrophotographic photosensitive members 1Y, 1M, 1C and 1K for first color to fourth color from which the transfer residual developers (toners) have been removed by the cleaning members 7Y, 7M, 7C and 7K, respectively, may also be subjected to charge elimination by pre-exposure light emitted from pre-exposure means. However, where as shown in FIG. 4 contact charging making use of a roller-shaped primary charging member (a primary charging roller) or the like is employed in the charging of the surface of each electrophotographic photosensitive member, the pre-exposure is not necessarily required.

Incidentally, in FIG. 4, reference numeral 16 denotes a separation charging assembly for separating the transfer material from the transfer material transport belt.

The electrophotographic endless belt of the present invention may preferably be used in the above intermediate transfer belt and transfer material transporting belt.

In the foregoing, in regard to the electrophotographic endless belt of the present invention, it has chiefly been described on a case in which it is used as the intermediate transfer belt or the transfer material transporting belt. Besides the intermediate transfer belt or the transfer material transporting belt, the electrophotographic endless belt of the present invention is applicable to the whole field of endless belts used in electrophotographic apparatus, such as a photosensitive belt, transporting belts other than the transfer material transporting belt, a fixing belt, a developing belt, a charging belt and a paper feed belt.

A reinforcing member, a guide member and a position detection member may also optionally be attached to the electrophotographic endless belt.

The present invention is described below in greater detail by giving specific working examples. The present invention is by no means limited to these. In the following, "part(s)" refers to "part(s) by weight".

EXAMPLE 1

Formulation of Resin Composition:

| | |
|---|---|
| Polyamide 12 | 72 parts |
| Ethylene-glycidyl methacrylate copolymer (IGETABOND E, available from Sumitomo Chemical Co., Ltd.) | 2 parts |
| Acetylene black (DENKA BLACK, powdery product, available from Denki Kagaku Kogyo Kabushiki Kaisha) | 13 parts |
| Zinc oxide | 13 parts |

Kneading:
Kneader: Twin-screw extruder of 30 mm in diameter and of a same-direction rotating intermesh type.
Screw: Double-thread type; L/D=38.
Resin composition temperature: 280° C.
Screw rotation: 300 rpm.
Ejection speed: 20 kg/h.

A resin composition formulated as above, obtained by mixing by means of a tumbling mixer, was kneaded by means of the above twin-screw extruder to prepare a kneaded product (pellets) of 2 mm to 3 mm in diameter.

Extrusion (Blown-Film Extrusion):

The kneaded product (resin composition, pellets) of 2 mm to 3 mm in diameter was put into the extruder 101 shown in FIG. 1, from the hopper 102, and this was melted and then extruded through the circular die 103 (diameter: 100 mm; die gap: 800 μm) to form a cylindrical product of the resin composition. The temperature of the resin composition when extruded was measured with the thermometer 110 to ascertain that it was 260° C., and was measured with the thermometer disposed in the vicinity of the outlet of the circular die 103, to ascertain that it was 265° C. Also, the speed at which the resin composition was extruded through the circular die 103 was 1 m/min.

Subsequently, air was blown from the gas inlet passage 104 to scale-up inflate the cylindrical product of the resin composition to form it into a cylindrical film. This was taken off at a take-off speed of 5 m/min, and this was continuously cut at intervals of 300 mm in the direction perpendicular to its generatrix direction to produce endless-form Belt 1. The rate of scale-up was 1.6.

Adjustment of Size and Surface Smoothness:

On this Belt 1, its size and surface smoothness were adjusted using a set of cylindrical forms made of metals having different coefficients of thermal expansion. In the inner form, aluminum was used, which has a high coefficient of thermal expansion. In the outer form, stainless steel was used, which has a lower coefficient of thermal expansion the aluminum. As the outer form, used was one the inside surface of which was put to buffing to be mirror-finished. The size gap between the outer diameter of the inner form and the inner diameter of the outer form was 140 μm. Belt 1 was placed over the inner form, and this was inserted into the outer form, followed by heating at 220° C. for 5 minutes. After cooling, Belt 1 was removed from the inner form and outer form, and its edges were cut away to obtain the "resin layer" of 160 mm in diameter.

To this belt, a meandering preventive member was attached and a black seal was stuck as a position detection member.

Thus, Electrophotographic Endless Belt 1 of a single-layer type was produced.

T-$\log_{10}$ η curve of resin composition, volume resistivity and surface resistivity of resin layer, and thickness of resin layer:

In the T-$\log_{10}$ η curve of the resin composition for the resin layer of Electrophotographic Endless Belt 1, the gently inclined region the inclination Δ $\log_{10}$ η/ΔT of which is from −0.02 to 0 was present in the range of $\log_{10}$ η of from $\log_{10}$ 1,000 to $\log_{10}$ 8,000. Also, the temperature range of this gently inclined region was 10° C. or more (stated specifically, it was from 220° C. to 270° C.; the balance being 50° C.).

The volume resistivity of Electrophotographic Endless Belt 1 (resin layer) was $9.2 \times 10^{10}$ Ω·cm as average value, and its maximum value/minimum value was 3.5. Also, the surface resistivity thereof was $5.0 \times 10^{11}$ Ω/square as average value, and its maximum value/minimum value was 3.3.

The thickness of the resin layer of Electrophotographic Endless Belt 1 was 100 μm as average value, the maximum value of the thickness was 104% of its average value, and also the minimum value of the thickness was 96% of its average value.

EXAMPLES 2 to 10 & COMPARATIVE EXAMPLES 1 to 3

Electrophotographic endless belts of a single-layer type were produced in the same manner as in Example 1 except that in Example 1 the formulation of the resin composition was changed as shown in Table 1 or 2 and that the conditions (resin composition temperature, screw revolution and ejection speed) in kneading the resin composition before the extrusion was carried out, the conditions (extruder temperature and resin composition temperature) in extruding the kneaded resin composition and the condition (temperature) in adjusting the size and surface smoothness were changed as shown in Table 3. These belts obtained are designated as Electrophotographic Endless Belts 2 to 13, respectively.

The T-$\log_{10}$ η curve of each resin composition, the volume resistivity and surface resistivity of each resin layer of Electrophotographic Endless Belts 2 to 13 and the thickness of each resin layer of the same are shown in Table 4.

TABLE 1

| Formulation of resin composition | |
|---|---|
| Example 1: | |
| Polyamide 12 (GRILAMID L25, K.K. Ems Showa Denko), | 72 parts. |
| Ethylene-glycidyl methacrylate copolymer (IGETABOND E), | 2 parts. |
| Acetylene black (DENKA BLACK, powdery product, Denki Kagaku Kogyo K.K.), | 13 parts. |
| Zinc Oxide No. 1 (Sakai Chemical Industry, Co., Ltd.), | 13 parts |
| Example 2: | |
| Polyamide 12 (GRILAMID L25, K.K. Ems Showa Denko), | 64 parts. |
| Ethylene-glycidyl methacrylate copolymer (IGETABOND E), | 10 parts. |
| Acetylene black (DENKA BLACK, powdery product, Denki Kagaku Kogyo K.K.), | 13 parts. |
| Zinc Oxide No. 1 (Sakai Chemical Industry, Co., Ltd.), | 13 parts |
| Example 3: | |
| Polyamide 12 (GRILAMID L25, K.K. Ems Showa Denko), | 49 parts. |
| Ethylene-glycidyl methacrylate copolymer (IGETABOND E), | 25 parts. |
| Acetylene black (DENKA BLACK, powdery product, Denki Kagaku Kogyo K.K.), | 12 parts. |
| Zinc Oxide No. 1 (Sakai Chemical Industry, Co., Ltd.), | 14 parts |
| Example 4: | |
| Polyamide 12 (GRILAMID L25, K.K. Ems Showa Denko), | 38 parts. |
| Ethylene-glycidyl methacrylate copolymer (IGETABOND E), | 30 parts. |
| Acetylene black (DENKA BLACK, powdery product, Denki Kagaku Kogyo K.K.), | 15 parts. |
| Zinc Oxide No. 1 (Sakai Chemical Industry, Co., Ltd.), | 17 parts |
| Example 5: | |
| Polyamide 6.10 (AMILAN CM2001, Toray Industries, Inc.), | 68 parts. |
| Ethylene-glycidyl methacrylate copolymer (IGETABOND E), | 6 parts. |
| Acetylene black (DENKA BLACK, powdery product, Denki Kagaku Kogyo K.K.), | 13 parts. |
| Zinc Oxide No. 1 (Sakai Chemical Industry, Co., Ltd.), | 13 parts |
| Example 6: | |
| Polyamide 6.10 (AMILAN CM2001, Toray Industries, Inc.), | 58 parts. |
| Ethylene-glycidyl methacrylate copolymer (IGETABOND E), | 16 parts. |
| Acetylene black (DENKA BLACK, powdery product, Denki Kagaku Kogyo K.K.), | 15 parts. |
| Zinc Oxide No. 1 (Sakai Chemical Industry, Co., Ltd.), | 13 parts |
| Example 7: | |
| Polyamide 12 (GRILAMID L25, K.K. Ems Showa Denko), | 30 parts. |
| Polyamide 6.10 (AMILAN CM2001, Toray Industries, Inc.), | 30 parts. |
| Ethylene-glycidyl methacrylate copolymer (IGETABOND 2C), | 14 parts. |
| Acetylene black (DENKA BLACK, powdery product, Denki Kagaku Kogyo K.K.), | 12 parts. |
| Zinc Oxide No. 1 (Sakai Chemical Industry, Co., Ltd.), | 14 parts |
| Example 8: | |
| Polyamide 12 (GRILAMID L25, K.K. Ems Showa Denko), | 45 parts. |
| Polyamide 6.10 (AMILAN CM2001, Toray Industries, Inc.), | 20 parts. |
| Ethylene-glycidyl methacrylate copolymer (IGETABOND 2B), | 9 parts. |
| Acetylene black (DENKA BLACK, powdery product, Denki Kagaku Kogyo K.K.), | 15 parts. |
| Zinc Oxide No. 1 (Sakai Chemical Industry, Co., Ltd.), | 11 parts |
| Example 9: | |
| Polyamide 12 (GRILAMID L25, K.K. Ems Showa Denko), | 68 parts. |
| Ethylene-maleic anhydride copolymer (F3000), | 6 parts. |
| Acetylene black (DENKA BLACK, powdery product, Denki Kagaku Kogyo K.K.), | 12 parts. |
| Zinc Oxide No. 1 (Sakai Chemical Industry, Co., Ltd.), | 14 parts |
| Example 10: | |
| Polyamide 12 (GRILAMID L25, K.K. Ems Showa Denko), | 67 parts. |
| Ethylene-maleic anhydride copolymer (NUK-ACE GA-004), | 6 parts. |

TABLE 1-continued

| Formulation of resin composition | |
|---|---|
| Acetylene black (DENKA BLACK, powdery product, Denki Kagaku Kogyo K.K.), | 12 parts. |
| Zinc Oxide No. 1 (Sakai Chemical Industry, Co., Ltd.), | 14 parts |

TABLE 2

| Formulation of resin composition | |
|---|---|
| Comparative Example 1: | |
| Polyamide 12 (GRILAMID L25, K.K. Ems Showa Denko), | 81 parts. |
| Acetylene black (DENKA BLACK, powdery product, Denki Kagaku Kogyo K.K.), | 19 parts. |

TABLE 2-continued

| Formulation of resin composition | |
|---|---|
| Comparative Example 2: | |
| Polyamide 6.10 (AMILAN CM2001, Toray Industries, Inc.), | 74 parts. |
| Acetylene black (DENKA BLACK, powdery product, Denki Kagaku Kogyo K.K.), | 17 parts. |
| Zinc Oxide No. 1 (Sakai Chemical Industry, Co., Ltd.), | 9 parts |
| Comparative Example 3: | |
| Polyamide 6.10 (AMILAN CM2001, Toray Industries, Inc.), | 70 parts. |
| Ethylene-glycidyl methacrylate copolymer (IGETABOND E), | 2 parts. |
| Acetylene black (DENKA BLACK, powdery product, Denki Kagaku Kogyo K.K.), | 17 parts. |
| Zinc Oxide No. 1 (Sakai Chemical Industry, Co., Ltd.), | 11 parts |

TABLE 3

| | Kneading | | | Extrusion | | | Temperature at the time of adjustment of size and surface smoothness |
|---|---|---|---|---|---|---|---|
| | Resin composition temp. | Kneader Screw revolution | Ejection speed | Extruder temperature setting | Resin composition temperature Thermometer 110 | In the vicinity of circular die | |
| Example: | | | | | | | |
| 1 | 280° C. | 300 rpm | 20 kg/h | 260–270° C. | 260° C. | 265° C. | 220° C. |
| 2 | 280° C. | 280 rpm | 18 kg/h | 250–260° C. | 255° C. | 255° C. | 220° C. |
| 3 | 275° C. | 310 rpm | 21 kg/h | 235–245° C. | 240° C. | 240° C. | 220° C. |
| 4 | 275° C. | 280 rpm | 18 kg/h | 235–245° C. | 255° C. | 255° C. | 220° C. |
| 5 | 285° C. | 300 rpm | 20 kg/h | 260–270° C. | 265° C. | 265° C. | 240° C. |
| 6 | 295° C. | 310 rpm | 20 kg/h | 250–260° C. | 255° C. | 255° C. | 245° C. |
| 7 | 295° C. | 300 rpm | 20 kg/h | 245–255° C. | 250° C. | 250° C. | 240° C. |
| 8 | 280° C. | 300 rpm | 20 kg/h | 250–260° C. | 255° C. | 255° C. | 240° C. |
| 9 | 255° C. | 300 rpm | 15 kg/h | 245–255° C. | 250° C. | 250° C. | 235° C. |
| 10 | 255° C. | 250 rpm | 12 kg/h | 235–245° C. | 240° C. | 240° C. | 235° C. |
| Comparative Example: | | | | | | | |
| 1 | 260° C. | 300 rpm | 20 kg/h | 230–240° C. | 235° C. | 235° C. | 240° C. |
| 2 | 260° C. | 315 rpm | 22 kg/h | 245–255° C. | 250° C. | 250° C. | 240° C. |
| 3 | 275° C. | 300 rpm | 20 kg/h | 245–255° C. | 250° C. | 250° C. | 240° C. |

TABLE 4

| | Gently inclined region* | | Volume resistivity | | Surface resistivity | | Thickness of resin layer | Min. value for av. value | Min. value for av. value |
|---|---|---|---|---|---|---|---|---|---|
| | | Its temp. region | Average value | Max. value /min. value | Average value | Max. value /min. value | Av. value | | |
| Example: | | | | | | | | | |
| 1 | Present | 220–270° C. | $9.2 \times 10^{10}$ Ω·cm | 3.5 | $5.0 \times 10^{11}$ Ω/sq. | 3.3 | 100 μm | 104% | 96% |
| 2 | Present | 220–270° C. | $8.8 \times 10^{10}$ Ω·cm | 3.9 | $3.3 \times 10^{11}$ Ω/sq. | 4.3 | 100 μm | 103% | 97% |
| 3 | Present | 220–270° C. | $9.3 \times 10^{10}$ Ω·cm | 4.5 | $3.0 \times 10^{11}$ Ω/sq. | 3.3 | 100 μm | 104% | 96% |
| 4 | Present | 220–270° C. | $1.0 \times 10^{11}$ Ω·cm | 5.2 | $8.9 \times 10^{11}$ Ω/sq. | 8.9 | 100 μm | 108% | 92% |
| 5 | Present | 220–270° C. | $7.9 \times 10^{10}$ Ω·cm | 3.5 | $6.5 \times 10^{11}$ Ω/sq. | 3.3 | 100 μm | 107% | 93% |
| 6 | Present | 220–270° C. | $1.8 \times 10^{11}$ Ω·cm | 5.5 | $9.5 \times 10^{11}$ Ω/sq. | 4.2 | 100 μm | 105% | 95% |
| 7 | Present | 220–270° C. | $3.3 \times 10^{10}$ Ω·cm | 2.2 | $1.2 \times 10^{11}$ Ω/sq. | 4.8 | 100 μm | 104% | 96% |
| 8 | Present | 220–270° C. | $2.2 \times 10^{11}$ Ω·cm | 7.5 | $7.5 \times 10^{11}$ Ω/sq. | 8.3 | 100 μm | 107% | 93% |
| 9 | Present | 220–270° C. | $3.5 \times 10^{11}$ Ω·cm | 5.5 | $9.5 \times 10^{11}$ Ω/sq. | 5.3 | 100 μm | 108% | 92% |
| 10 | Present | 220–270° C. | $8.2 \times 10^{10}$ Ω·cm | 6.8 | $4.8 \times 10^{11}$ Ω/sq. | 5.7 | 100 μm | 104% | 96% |

TABLE 4-continued

| | | | Volume resistivity | | Surface resistivity | | Thickness of resin layer | | |
|---|---|---|---|---|---|---|---|---|---|
| | Gently inclined region* | | | Max. value | | Max. value | | Min. value for | Min. value for |
| | | Its temp. region | Average value | /min. value | Average value | /min. value | Av. value | av. value | av. value |
| Comparative Example: | | | | | | | | | |
| 1 | Present | 220–270° C. | $6.5 \times 10^{10}$ Ω·cm | 6.8 | $1.2 \times 10^{11}$ Ω/sq. | 7.3 | 100 μm | 118% | 82% |
| 2 | Present | 220–270° C. | $3.5 \times 10^{11}$ Ω·cm | 8.5 | $1.1 \times 10^{11}$ Ω/sq. | 7.7 | 100 μm | 117% | 83% |
| 3 | None | — | $2.0 \times 10^{10}$ Ω·cm | 5.3 | $8.5 \times 10^{10}$ Ω/sq. | 7.4 | 100 μm | 119% | 81% |

*Gently inclined region the inclination of which is from –0.02 to 0, in the range of $\log_{10}\eta$ of from $\log_{10} 1{,}000$ to $\log_{10} 8{,}000$.

Actual-Use Evaluation 1

Electrophotographic Endless Belts 1, 3, 4, 6 to 10 and 13 were each set as a transfer material transporting belt in the color electrophotographic apparatus of an in-line system, set up as shown in FIG. 4, and two-color solid images and halftone images were printed on sheets of paper of 80 g/m² in basis weight in an environment of 15° C. and 10% RH (L/L) and an environment of 30° C. and 80% RH(H/H) to evaluate reproduced images.

As a result of the evaluation of reproduced images, in the cases when Electrophotographic Endless Belts 1, 3, 4 and 6 to 9 were used, neither transfer non-uniformity nor blank areas caused by poor transfer occurred on the reproduced images.

In the cases when Electrophotographic Endless Belts 10 and 13 were used, transfer non-uniformity and blank areas caused by poor transfer occurred.

Electrophotographic Endless Belts 1, 3, 4, 6 to 10 and 13 were also each set as a transfer material transporting belt in the color electrophotographic apparatus of an in-line system, set up as shown in FIG. 4, and images were reproduced on 50,000 sheets in an environment of 23° C. and 50% RH(N/N) to evaluate belt durability.

As a result of the evaluation of belt durability, neither break nor elongation occurred on Electrophotographic Endless Belts 1, 3, 4 and 6 to 13.

Actual-Use Evaluation 2

Electrophotographic Endless Belts 2, 5, 10 and 12 were each set as an intermediate transfer belt in the color electrophotographic apparatus of an intermediate transfer system, set up as shown in FIG. 3, and two-color solid images and halftone images were printed on sheets of paper of 80 g/m² in basis weight in an environment of 15° C. and 10% RH (L/L) and an environment of 30° C. and 80% RH(H/H) to evaluate reproduced images.

As a result of the evaluation of reproduced images, in the cases when Electrophotographic Endless Belts 2, 5 and 10 were used, neither transfer non-uniformity nor blank areas caused by poor transfer occurred on the reproduced images.

In the case when Electrophotographic Endless Belt 12 was used, transfer non-uniformity and blank areas caused by poor transfer occurred.

Electrophotographic Endless Belts 2, 5, 10 and 12 were also each set as an intermediate transfer belt in the color electrophotographic apparatus of an intermediate transfer system, set up as shown in FIG. 3, and images were reproduced on 50,000 sheets in an environment of 23° C. and 50% RH(N/N) to evaluate belt durability.

As a result of the evaluation of belt durability, neither break nor elongation occurred on Electrophotographic Endless Belts 2, 5, 10 and 12.

Conclusion:

The following can be said from the results obtained in Examples and Comparative Example.

That is, the electrophotographic endless belts of Examples and Comparative Examples all have a high belt durability because of their use of polyamide (nylon), and neither break (cracking) nor elongation occurred even when images are reproduced on 50,000 sheets.

However, as is clear from comparison of Examples with Comparative Examples, the electrophotographic endless belts of Comparative Examples 1 and 2, as being different from the electrophotographic endless belts of Examples, do not make use of the copolymer obtained by copolymerization of an olefin and an oxygen-containing heterocyclic compound, and hence have an inferior thickness non-uniformity, resulting in an inferior transfer performance.

As is also clear from comparison of Examples with Comparative Example 3, the electrophotographic endless belt of Comparative Example 3 makes use of the copolymer obtained by copolymerization of an olefin and an oxygen-containing heterocyclic compound, but, as being different from the electrophotographic endless belts of Examples, does not satisfy the prescription in the present invention in regard to the T-$\log_{10} \eta$ curve of the resin composition, and hence the resin layer has an inferior thickness non-uniformity, resulting in an inferior transfer performance.

This application claims priority from Japanese Patent Application No. 2003-400055 filed on Nov. 28, 2003, which is hereby incorporated by reference herein.

What is claimed is:

1. An electrophotographic endless belt comprising a resin layer formed of a resin composition containing a polyamide, wherein;
   said resin composition further contains a copolymer obtained by copolymerization of an olefin and an oxygen-containing heterocyclic compound;
   a curve (T-$\log_{10} \eta$ curve) showing the relationship between temperature T (° C.) and common logarithm $\log_{10} \eta$ of melt viscosity $\eta$ (Pa·s), of said resin composition has, in the range of $\log_{10} \eta$ of from $\log_{10} 1{,}000$ to $\log_{10} 8{,}000$, a gently inclined region the inclination $\Delta \log_{10} \eta/\Delta T$ of which is from –0.02 to 0, and the gently inclined region has a temperature range of 10° C. or more; and said resin layer has a thickness the maximum thickness of which is 115% or less of the average value of the thickness of said resin layer and the minimum thickness of which is 85% or more of the average value of the thickness of said resin layer.

2. The electrophotographic endless belt according to claim 1, wherein said polyamide in said resin composition is in a proportion of from 40% by weight to 74% by weight based on the whole weight of the resin composition.

3. The electrophotographic endless belt according to claim 1, wherein said olefin is ethylene.

4. The electrophotographic endless belt according to claim 1, wherein said oxygen-containing heterocyclic compound is glycidyl methacrylate.

5. The electrophotographic endless belt according to claim 1, wherein said oxygen-containing heterocyclic compound is maleic anhydride.

6. The electrophotographic endless belt according to claim 1, wherein the molecule of said copolymer obtained by copolymerization of an olefin and an oxygen-containing heterocyclic compound is a molecule formed by straight-chain linkage between a unit derived from said olefin and a unit derived from said oxygen-containing heterocyclic compound.

7. The electrophotographic endless belt according to claim 1, wherein said polyamide is at least one resin selected from the group consisting of polyamide 6.10, polyamide 6.12, polyamide 11 and polyamide 12.

8. The electrophotographic endless belt according to claim 1, which is a transfer material transporting belt.

9. The electrophotographic endless belt according to claim 1, which is an intermediate transfer belt.

10. A process for producing an electrophotographic endless belt having a resin layer formed of a resin composition containing a polyamide; the process comprising the steps of:
   extruding the resin composition from the interior of an extruder connected to a circular die, to the exterior of the extruder via the circular die to obtain a cylindrical product of the resin composition; and
   forming the cylindrical product of the resin composition into the resin layer of the electrophotographic endless belt;
   wherein;
   said resin composition further contains a copolymer obtained by copolymerization of an olefin and an oxygen-containing heterocyclic compound;
   a curve (T-$\log_{10} \eta$ curve) showing the relationship between temperature T (° C.) and common logarithm $\log_{10} \eta$ of melt viscosity $\eta$ (Pa·s) of said resin composition has, in the range of logon of from $\log_{10}$ 1,000 to $\log_{10}$ 8,000, a gently inclined region the inclination $\Delta \log_{10} \eta/\Delta T$ of which is from −0.02 to 0, and the gently inclined region has a temperature range of 10° C. or more; and
   when said resin composition is extruded, said resin composition has temperature which is within the temperature range of said gently inclined region.

11. The process for producing an electrophotographic endless belt according to claim 10, wherein said polyamide in said resin composition is in a proportion of from 40% by weight to 74% by weight based on the whole weight of the resin composition.

12. The process for producing an electrophotographic endless belt according to claim 10, wherein said olefin is ethylene.

13. The process for producing an electrophotographic endless belt according to claim 10, wherein said oxygen-containing heterocyclic compound is glycidyl methacrylate.

14. The process for producing an electrophotographic endless belt according to claim 10, wherein said oxygen-containing heterocyclic compound is maleic anhydride.

15. The process for producing an electrophotographic endless belt according to claim 10, wherein the molecule of said copolymer obtained by copolymerization of an olefin and an oxygen-containing heterocyclic compound is a molecule formed by straight-chain linkage between a unit derived from said olefin and a unit derived from said oxygen-containing heterocyclic compound.

16. The process for producing an electrophotographic endless belt according to claim 10, wherein said polyamide is at least one resin selected from the group consisting of polyamide 6.10, polyamide 6.12, polyamide 11 and polyamide 12.

17. The process for producing an electrophotographic endless belt according to claim 10, wherein said electrophotographic endless belt is a transfer material transporting belt.

18. The process for producing an electrophotographic endless belt according to claim 10, wherein said electrophotographic endless belt is an intermediate transfer belt.

19. An electrophotographic apparatus comprising an electrophotographic endless belt having a resin layer formed of a resin composition containing a polyamide, wherein;
   said resin composition further contains a copolymer obtained by copolymerization of an olefin and an oxygen-containing heterocyclic compound;
   a curve (T-$\log_{10} \eta$ curve) showing the relationship between temperature T (° C.) and common logarithm $\log_{10} \eta$ of melt viscosity $\eta$ (Pa·s), of said resin composition has, in the range of $\log_{10} \eta$ of from $\log_{10}$ 1,000 to $\log_{10}$ 8,000, a gently inclined region the inclination $\Delta \log_{10} \eta/\Delta T$ of which is from −0.02 to 0, and the gently inclined region has a temperature range of 10° C. or more; and
   said resin layer has a thickness the maximum thickness of which is 115% or less of the average value of the thickness of said resin layer and the minimum thickness of which is 85% or more of the average value of the thickness of said resin layer.

* * * * *

UNITED STATES PATENT AND TRADEMARK OFFICE
CERTIFICATE OF CORRECTION

PATENT NO. : 7,201,967 B2  
APPLICATION NO. : 10/995269  
DATED : April 10, 2007  
INVENTOR(S) : Yuji Sakurai et al.

Page 1 of 1

It is certified that error appears in the above-identified patent and that said Letters Patent is hereby corrected as shown below:

ON THE TITLE PAGE [73]:

Assignee, "Canon Kabushiki Kaisha, Ohta-ku, Tokyo (JP)" should read --Canon Kabushiki Kaisha, Tokyo (JP)--.

COLUMN 5:

Line 35, "To -5(°C.)" should read --To -5(°C.).--.

COLUMN 23:

Line 50, "logon" should read --$\log_{10}\eta$--.

Signed and Sealed this

Eighteenth Day of December, 2007

JON W. DUDAS  
*Director of the United States Patent and Trademark Office*